United States Patent
Oogaki

(10) Patent No.: US 8,367,572 B2
(45) Date of Patent: Feb. 5, 2013

(54) OPTICAL GLASS

(75) Inventor: Akio Oogaki, Amagasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 322 days.

(21) Appl. No.: 12/782,968

(22) Filed: May 19, 2010

(65) Prior Publication Data

US 2010/0298111 A1 Nov. 25, 2010

(30) Foreign Application Priority Data

May 22, 2009 (JP) ................. 2009-124083

(51) Int. Cl.
C03C 3/16 (2006.01)
C03C 3/19 (2006.01)
C03C 3/17 (2006.01)

(52) U.S. Cl. ............... 501/45; 501/47; 501/48

(58) Field of Classification Search ........... 501/45, 501/47, 48
See application file for complete search history.

(56) References Cited

U.S. PATENT DOCUMENTS

| | | | | |
|---|---|---|---|---|
| 6,127,297 A * | 10/2000 | Hashimoto | ........... | 501/46 |
| 6,225,244 B1 * | 5/2001 | Oguma | ........... | 501/45 |
| 6,939,820 B2 * | 9/2005 | Numaguchi et al. | ........... | 501/45 |
| 7,419,923 B2 * | 9/2008 | Mori et al. | ........... | 501/47 |
| 7,598,189 B2 | 10/2009 | Fujiwara et al. | | |
| 2004/0259714 A1 * | 12/2004 | Fujiwara et al. | ........... | 501/45 |
| 2005/0143250 A1 * | 6/2005 | Fujiwara et al. | ........... | 501/48 |
| 2006/0150682 A1 * | 7/2006 | Fujiwara et al. | ........... | 65/102 |
| 2006/0166806 A1 * | 7/2006 | Fechner et al. | ........... | 501/45 |
| 2007/0111875 A1 * | 5/2007 | Fujiwara | ........... | 501/47 |
| 2008/0187737 A1 * | 8/2008 | Fujiwara et al. | ........... | 428/220 |
| 2010/0035743 A1 * | 2/2010 | Taguchi | ........... | 501/46 |

FOREIGN PATENT DOCUMENTS

| | | | | |
|---|---|---|---|---|
| JP | 56073644 A | * | 6/1981 | |
| JP | 60171244 A | * | 9/1985 | |
| JP | 61040839 A | * | 2/1986 | |
| JP | 63-011544 | | 1/1988 | |
| JP | 02188442 A | * | 7/1990 | |

* cited by examiner

*Primary Examiner* — Karl Group
*Assistant Examiner* — Elizabeth A Bolden
(74) *Attorney, Agent, or Firm* — Brinks Hofer Gilson & Lione

(57) ABSTRACT

An optical glass has a composition including: 40 to 65 mass % of $P_2O_5$, and 0 to less than 5 mass % of $Li_2O+Na_2O+K_2O$. In the optical glass, $(MgO+CaO)/(Li_2O+Na_2O+K_2O)$ which is a ratio of the total content expressed in mass % of MgO and CaO to the total content expressed in mass % of $Li_2O$, $Na_2O$, and $K_2O$, is in a range from 6 to 38.

7 Claims, No Drawings

OPTICAL GLASS

This application is based on Japanese Patent Application No. 2009-124083 filed on May 22, 2009, in Japanese Patent Office, the entire content of which is hereby incorporated by reference.

TECHNICAL FIELD

The present invention relates to optical glass, and more particularly relates to phosphate optical glass with low dispersion.

BACKGROUND

Phosphate optical glass containing $P_2O_5$ as its main component is valuable optical glass which is used as a material for various optical elements because it exhibits low dispersion as its characteristics. On the other hand, since $P_2O_5$ is soluble in water, phosphate optical glass has a relatively low weather resistance, which has been a problem. Therefore, attempts to enhance the weather resistance of phosphate optical glass have been made. For example, JP-A No. 63-11544 and U.S. Pat. No. 7,598,189 disclose phosphate optical glass with improved weather resistance prepared by determining the ratios of composition to be prescribed ranges.

In recent years, an increasing number of equipments, such as portable equipments and onboard equipments, have been used in a severe environment. Therefore, phosphate optical glass has been required to have higher weather resistance. However, it is still difficult to say that phosphate optical glass disclosed in JP-A No. 63-11544 and U.S. Pat. No. 7,598,189 has sufficient weather resistance, and it has been a problem that the optical glass hardly meet the above demand.

SUMMARY

The present invention has been achieved, in view of such the above technical problem, to provide optical glass with excellent weather resistance and low dispersion.

An optical glass relating to the prevent invention has a composition comprising: 40-65 mass % of $P_2O_5$: and 1-5 mass % of $Li_2O+Na_2O+K_2O$, where 5 mass % is excluded. In the optical glass, $(MgO+CaO)/(Li_2O+Na_2O+K_2O)$ which is a ratio of a total content expressed in mass % of MgO and CaO to a total content expressed in mass % of $Li_2O$, $Na_2O$, and $K_2O$, is in a range from 6 to 38.

Objects, features and advantages according to the present invention will become more apparent upon reading of the following detailed description.

DESCRIPTION OF THE PREFERRED EMBODIMENT

Hereafter, although an embodiment of the present invention will be described in details, the present invention is not limited to this embodiment.

The inventor of the prevent invention, as a result of earnest and extensive study, has found that the ratio $(MgO+CaO)/(Li_2O+Na_2O+K_2O)$ which is a ratio of a total content expressed in mass % of MgO and CaO to a total content expressed in mass % of $Li_2O$, $Na_2O$, and $K_2O$ in glass components, can be an indicator of obtaining glass with excellent weather resistance. It has been found that MgO and CaO are greatly effective components to enhance the weather resistance of phosphate optical glass. On the other hand, it has also been found that $Li_2O$, $Na_2O$ and $K_2O$ worsen the weather resistance, but they are essential components to stabilize phosphate optical glass. As a result of a further study based on these matters, the inventor has found that phosphate optical glass with an excellent weather resistance and low dispersion can be obtained by employing a composition including 40 to 65 mass % of $P_2O_5$ and 1 to less than 5 mass % of the sum of $Li_2O$, $Na_2O$ and $K_2O$ and by determining $(MgO+CaO)/(Li_2O+Na_2O+K_2O)$ which is a ratio of a total content expressed in mass % of MgO and CaO to a total content expressed in mass % of $Li_2O$, $Na_2O$, and $K_2O$ to be in the range from 6 to 38.

The reason why the content of each component of the optical glass relating to the present invention is determined as stated above, will be explained below.

$P_2O_5$ is a main and essential component in view of forming glass. When its content is 40 mass % or more, the optical glass keeps aimed optical constants. When the content is 65 mass % or less, the weather resistance is enhanced. Therefore, the content of $P_2O_5$ is determined to be in the range from 40 to 65 mass %. Especially, the range from 41 to 62 mass % is more preferable.

$Al_2O_3$ is an effective component to enhance the weather resistance. When its content is 1 mass % or more, it exhibits the effect to further enhance the weather resistance. When the content is 10 mass % or less, the glass is hardly devitrified. Therefore, it is preferable that the content of $Al_2O_3$ is in the range from 1 to 10 mass %. Especially, the range from 3 to 8 mass % is more preferable.

$B_2O_3$ has an effect to lower the dispersion and is a component contributing to stabilization of the glass. When its content is 1 mass % or more, such the effect can be satisfactory obtained. When the content is 20 mass % or less, deterioration of the weather resistance can be avoided. Therefore, it is preferable that the content of $B_2O_3$ is in the range from 1 to 20 mass %. Especially, the range from 5 to 15 mass % is more preferable.

$Li_2O$, $Na_2O$ and $K_2O$ are alkali metal oxide components, and each component eases the vitrification and contributes to stabilization of the glass. When the total content of $Li_2O$, $Na_2O$ and $K_2O$ is 1 mass % or more, such the effect can be satisfactory obtained. When the total content is less than 5 mass %, deterioration of the weather resistance can be avoided. Therefore the total content of $Li_2O$, $Na_2O$ and $K_2O$ is determined to be in the range from 1 to less than 5 mass %. It is more preferable that the total content is in the range from 1 to 4.6 mass %. In these components, $LiO_2$ has the highest effect for the stabilization of the glass, and its adverse influence to the weather resistance is relatively small. From the viewpoint of the influence to the glass stabilization and weather resistance, it is preferable that the content of $Li_2O$ is in the range from 1 to less than 5 mass %, and it is more preferable that the range is 1 to 4.6 mass %. $Na_2O$ and $K_2O$ are optional components. It is preferable that the content of $Na_2O$ is in the range from 0 to 3 mass % (where the range includes 0), and that the content of $K_2O$ is in the range from 0 to 3 mass % (where the range includes 0).

CaO is a greatly effective component to enhance the weather resistance. CaO is a main component of tooth enamel, which is the same as $P_2O_5$. Therefore, CaO can form calcium phosphate $Ca_3(PO_4)_2$ with transparency, colorlessness, and water-insolubility. When the content of CaO is 6 mass % or more, the effect to enhance the weather resistance can be sufficiently obtained. When the content is 38 mass % or less, the glass is hardly devitrified. Therefore, it is preferable that the content of CaO is in the range from 6 to 38 mass %, and it is more preferable that the content is in the range from more than 18 to 34 mass %.

MgO has an effect to enhance the weather resistance by the same extent to CaO. However, being compared with CaO, MgO is inferior to CaO in washability. Under an ultrasonic cleaning in pure water, it can easily make latent scratch. Therefore, MgO is provided as an optional component. It is preferable that the content of MgO is in the range from 0 to 25 mass % (where the range includes 0), and it is more preferable that the range is from 0 to 20 mass % (where the range includes 0).

As described above, the ratio (MgO+CaO)/(Li$_2$O+Na$_2$O+K$_2$O) which is the ratio of the total content expressed in mass % of MgO and CaO to the total content expressed in mass % of Li$_2$O, Na$_2$O, and K$_2$O, is defined to be in the range from 6 to 38 weigh %, in the viewpoint of a balance between the weather resistance and stabilization of the glass. It is more preferable that the range is from 8 to 30 mass %.

SrO is an optional component. Though SrO has an effect to stabilize the glass, the excessive content can deteriorate the washability significantly. Therefore, it is preferable that the content of SrO is in the range from 0 to 10 mass % (where the range includes 0).

BaO is an optional component. Though BaO is greatly effective to stabilize the glass, the excessive content can significantly deteriorate the weather resistance. Therefore, it is preferable that the content of BaO is in the range from 0 to 12 mass % (where the range includes 0).

ZnO is an optional component. Though ZnO is greatly effective to increase refractive index of the glass, the excessive content can deteriorate the weather resistance. Therefore, it is preferable that the content of ZnO is in the range from 0 to 14 mass % (where the range includes 0).

Sb$_2$O$_3$ is an optional component. Sb$_2$O$_3$ can be employed effectively as a clarifying agent when the glass is melted. Further, it can also be used as a decolorizing agent. It is preferable that the content of Sb$_2$O$_3$ is in the range from 0 to 0.5 mass % (where the range includes 0). When there is no need to use Sb$_2$O$_3$ as a clarifying agent or decolorizing agent, it is preferable that the glass does not contain Sb$_2$O$_3$.

It is preferable that the optical glass does not contain components other than those described above (for example, SiO$_2$, La$_2$O$_3$, Y$_2$O$_3$, TiO$_2$, CuO, Ta$_2$O$_5$, PbO, As$_2$O$_3$, and a fluorine component). However, it is allowed that the optical glass contains these components as much as they do not affect the properties of the optical glass relating to the present invention. In this case, it is preferable that the total content of P$_2$O$_5$, B$_2$O$_3$, Li$_2$O, Na$_2$O, K$_2$O, CaO, MgO, SrO, BaO, ZnO, and Sb$_2$O$_3$ is 95 mass % or more, and it is more preferable that the total content is 98 mass % or more.

Especially in the above components, it is preferable that the content of SiO$_2$ is in the range from 0 to 0.1 mass % (where the range includes 0), and it is more preferable that the optical glass does not contain SiO$_2$. It avoids the problem that the excessive content of SiO$_2$ can easily causes striae.

It is further preferable that the optical glass does not contain PbO and As$_2$O$_3$. Thereby, an influence of the optical glass on the environment can be controlled to be the minimum. Further, the optical glass does not preferably contain a fluorine component as a glass component, because a fluorine component requires a special processing apparatus for maintaining a proper work environment at the time of producing the optical glass.

Since the phosphate optical glass relating to the present invention contains the above components in the predetermined proportions, the optical glass exhibits an excellent weather resistance and a characteristic to have optical constants of the refractive index (nd) in the range from 1.54 to 1.62, and the Abbe number (vd) in the range from 65 to 70.

EXAMPLES

Examples which are provided to verify the effect of the present invention will be described below, but the scope of the present invention is not limited to the examples.

Fifteen kinds of optical glass (Examples 1 to 15) each having a composition with the component ratios satisfying those of the above-described embodiment, and two kinds of optical glass (Comparative Examples 1 and 2) each having a composition with component ratios outside those of the above-described embodiment were prepared according to the procedure described below. The glass compositions of Examples 1 through 15 are listed in Tables 1 through 3 and those of Comparative Examples 1 and 2 are listed in Table 4. The Comparative Example 1 was prepared by replication of Example 2 described in JP-A No. 63-11544 and Comparative Example 2 was prepared by replication of Example 3 described in U.S. Pat. No. 7,598,189.

TABLE 1

|  |  | Example 1 | Example 2 | Example 3 | Example 4 | Example 5 |
|---|---|---|---|---|---|---|
| P$_2$O$_5$ | (mass %) | 48.0 | 50.0 | 57.5 | 61.0 | 60.0 |
| Al$_2$O$_3$ | (mass %) | 4.0 | 5.0 | 5.5 | 7.0 | 6.5 |
| B$_2$O$_3$ | (mass %) | 11.0 | 12.0 | 10.0 | 10.0 | 9.8 |
| Li$_2$O | (mass %) | 3.0 | 3.0 | 3.0 | 2.8 | 2.8 |
| Na$_2$O | (mass %) |  |  |  | 0.2 |  |
| K$_2$O | (mass %) |  |  |  |  |  |
| CaO | (mass %) | 34.0 | 30.0 | 24.0 | 19.0 | 20.9 |
| MgO | (mass %) |  |  |  |  |  |
| SrO | (mass %) |  |  |  |  |  |
| BaO | (mass %) |  |  |  |  |  |
| ZnO | (mass %) |  |  |  |  |  |
| Sb$_2$O$_3$ | (mass %) |  |  |  |  |  |
| Total | (mass %) | 100.0 | 100.0 | 100.0 | 100.0 | 100.0 |
| Li$_2$O + Na$_2$O + K$_2$O | (mass %) | 3.0 | 3.0 | 3.0 | 3.0 | 2.8 |
| MgO + CaO | (mass %) | 34.0 | 30.0 | 24.0 | 19.0 | 20.9 |
| (MgO + CaO)/(Li$_2$O + Na$_2$O + K$_2$O) |  | 11.33 | 10.00 | 8.00 | 6.30 | 7.46 |
| nd |  | 1.5975 | 1.5892 | 1.5740 | 1.5597 | 1.5653 |
| vd |  | 65.6 | 66.7 | 67.5 | 68.2 | 68.0 |
| Weather resistance |  | A | A | A | A | A |

TABLE 2

|  |  | Example 6 | Example 7 | Example 8 | Example 9 | Example 10 |
|---|---|---|---|---|---|---|
| $P_2O_5$ | (mass %) | 48.0 | 47.8 | 47.0 | 40.8 | 47.2 |
| $Al_2O_3$ | (mass %) | 4.2 | 4.5 | 4.2 | 4.4 | 3.9 |
| $B_2O_3$ | (mass %) | 10.8 | 10.8 | 11.8 | 17.8 | 11.8 |
| $Li_2O$ | (mass %) | 2.0 | 1.9 | 2.7 | 3.0 | 2.7 |
| $Na_2O$ | (mass %) |  |  |  |  |  |
| $K_2O$ | (mass %) |  |  | 0.3 |  |  |
| CaO | (mass %) | 23.5 | 24.0 | 24.9 | 20.0 | 18.6 |
| MgO | (mass %) |  |  |  | 14.0 | 15.7 |
| SrO | (mass %) |  |  | 9.1 |  |  |
| BaO | (mass %) | 11.5 |  |  |  |  |
| ZnO | (mass %) |  | 11.0 |  |  |  |
| $Sb_2O_3$ | (mass %) |  |  |  |  | 0.1 |
| Total | (mass %) | 100.0 | 100.0 | 100.0 | 100.0 | 100.0 |
| $Li_2O + Na_2O + K_2O$ | (mass %) | 2.0 | 1.9 | 3.0 | 3.0 | 2.7 |
| MgO + CaO | (mass %) | 23.5 | 24.0 | 24.9 | 34.0 | 34.3 |
| (MgO + CaO)/($Li_2O + Na_2O + K_2O$) |  | 11.75 | 12.63 | 8.30 | 11.33 | 12.70 |
| nd |  | 1.5963 | 1.5916 | 1.5936 | 1.5836 | 1.5857 |
| νd |  | 66.8 | 65.2 | 66.2 | 65.4 | 66.2 |
| Weather resistance |  | A | A | A | A | A |

TABLE 3

|  |  | Example 11 | Example 12 | Example 13 | Example 14 | Example 15 |
|---|---|---|---|---|---|---|
| $P_2O_5$ | (mass %) | 48.0 | 48.0 | 47.9 | 47.9 | 61.2 |
| $Al_2O_3$ | (mass %) | 6.1 | 4.2 | 4.7 | 3.4 | 6.8 |
| $B_2O_3$ | (mass %) | 8.9 | 10.8 | 10.5 | 11.7 | 10.2 |
| $Li_2O$ | (mass %) | 4.1 | 2.0 | 1.0 | 2.9 | 2.8 |
| $Na_2O$ | (mass %) | 0.3 |  |  |  |  |
| $K_2O$ | (mass %) | 0.2 |  |  |  |  |
| CaO | (mass %) | 13.0 | 7.9 | 11.0 | 29.7 | 6.9 |
| MgO | (mass %) | 14.9 | 17.8 | 19.0 | 2.9 | 10.6 |
| SrO | (mass %) |  |  |  | 0.7 |  |
| BaO | (mass %) | 4.5 | 9.3 |  | 0.8 | 1.1 |
| ZnO | (mass %) |  |  | 5.9 |  | 0.4 |
| $Sb_2O_3$ | (mass %) |  |  |  |  |  |
| Total | (mass %) | 100.0 | 100.0 | 100.0 | 100.0 | 100.0 |
| $Li_2O + Na_2O + K_2O$ | (mass %) | 4.6 | 2.0 | 1.0 | 2.9 | 2.8 |
| MgO + CaO | (mass %) | 27.9 | 25.7 | 30.0 | 32.6 | 17.5 |
| (MgO + CaO)/($Li_2O + Na_2O + K_2O$) |  | 6.07 | 12.85 | 30.00 | 11.24 | 6.25 |
| nd |  | 1.5878 | 1.5767 | 1.5732 | 1.6010 | 1.5475 |
| νd |  | 67.4 | 67.4 | 67.6 | 65.9 | 69.0 |
| Weather resistance |  | A | A | A | A | A |

TABLE 4

|  |  | Comparative Example 1 | Comparative Example 2 |
|---|---|---|---|
| $P_2O_5$ | (mass %) | 65.0 | 52.90 |
| $Al_2O_3$ | (mass %) | 8.0 | 4.68 |
| $B_2O_3$ | (mass %) | 2.0 | 11.98 |
| $Li_2O$ | (mass %) | 5.0 | 3.43 |
| $Na_2O$ | (mass %) |  | 1.78 |
| $K_2O$ | (mass %) |  | 2.70 |
| CaO | (mass %) |  | 7.07 |
| MgO | (mass %) |  | 8.09 |
| SrO | (mass %) |  | 2.97 |
| BaO | (mass %) | 15.0 | 4.40 |
| $La_2O_3$ | (mass %) | 5.0 |  |
| Total | (mass %) | 100.0 | 100.00 |
| $Li_2O + Na_2O + K_2O$ | (mass %) | 5.00 | 7.91 |
| MgO + CaO | (mass %) | 0.0 | 15.16 |
| (MgO + CaO)/($Li_2O + Na_2O + K_2O$) |  | 0.00 | 1.92 |
| nd |  | 1.5550 | 1.5606 |
| νd |  | 68.0 | 68.5 |
| Weather resistance |  | B | B |

At first, employing glass raw materials which are generally used, for example, an oxide material, carbonate material, nitrate material, phosphate material, and hydroxide material, the raw materials of glass were prepared so as to achieve the aimed glass composition shown in Tables 1 to 4, and were sufficiently mixed as powder to prepare a mother material. The mother material was charged into a fusing furnace heated at 900° C.-1,300° C., then, it was melted, clarified, and mixed to be homogeneous. After that, the resulting material was cast in a cast die made of iron heated in advance, and was gradually cooled to the room temperature (25° C.) at a cooling rate of −50° C./hour. Thereby respective samples were prepared.

With respect to each sample, refractive index (nd) which is a refractive index at Helium d-line (wavelength of 587.56 nm) and Abbe number (νd) were measured, and the weather resistance was evaluated. The refractive index nd and the Abbe number νd were obtained by measuring each of the prepared example with measuring equipment "KPR-200" manufactured by Kalnew Optical Industries Co., Ltd. The weather resistance was evaluated by the following process. After each of the prepared samples was polished to have a mirror-finished surface, each sample was held in a thermo-hygrostat chamber with cleanliness at temperature of 60° C. and humidity of 95% for 168 hours. Then, each sample was taken out from the chamber and the surface of each sample was observed by a microscope (×40) to evaluate the weather resistance. When the condition of the surface appeared to be unchanged and each sample was judged to have an excellent weather resistance, the evaluation result was represented by the mark "A". When something unusual (generation of cloudiness and deposit of abnormal materials) appeared on the surface and each sample was judged to have a problem in the weather resistance, the evaluation result was represented by the mark "B".

The results are also shown in Tables 1 to 4. It has been verified that Comparative examples 1 and 2 which were optical glass having the composition with component ratios outside those of the above embodiments, showed a problem in the weather resistance, and that, on the other hand, Examples 1 to 15 which were optical glass having the composition with the component ratios satisfying the above embodiment, showed an excellent weather resistance.

Namely, optical glass of each of the examples has a composition comprising: 40-65 mass % of $P_2O_5$: and 1-5 mass % of $Li_2O+Na_2O+K_2O$, where 5 mass % is excluded. In the optical glass, $(MgO+CaO)/(Li_2O+Na_2O+K_2O)$ which is a ratio of a total content expressed in mass % of MgO and CaO to a total content expressed in mass % of $Li_2O$, $Na_2O$, and $K_2O$, is in a predetermined range, where MgO and CaO are components which are effective in enhancement of the weather resistance, and $Li_2O$, $Na_2O$, and $K_2O$ are components which worsen the weather resistance but are essential to stabilizing glass. Therefore, phosphate optical glass with excellent weather resistance and low dispersion can be obtained.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical glass having a composition comprising:
    $P_2O_5$: 41-62 mass %, and
    $Li_2O+Na_2O+K_2O$: 1-5 mass %, where 5 mass % is excluded, wherein $(MgO+CaO)/(Li_2O+Na_2O+K_2O)$ which is a ratio of a total content expressed in mass % of MgO and CaO to a total content expressed in mass % of $Li_2O$, $Na_2O$, and $K_2O$ is in a range from 6 to 38.

2. The optical glass of claim 1, wherein the composition further comprising:
    $Al_2O_3$: 1-10 mass %, $B_2O_3$: 1-20 mass %, $Li_2O$: 1-5 mass %, where 5 mass % is excluded, and CaO: 6-38 mass %.

3. The optical glass of claim 2, wherein the composition further comprising:
    $Na_2O$: 0-3 mass %, $K_2O$: 0-3 mass %, MgO: 0-25 mass %, SrO: 0-10 mass %, BaO: 0-12 mass %, ZnO: 0-14 mass %, and $Sb_2O_3$: 0-0.5 mass %.

4. The optical glass of claim 2, wherein the composition further comprising:
    $SiO_2$: 0-0.1 mass %.

5. The optical glass of claim 1, wherein the optical glass does not contain PbO, $As_2O_3$, and a fluorine component.

6. The optical glass of claim 1, wherein the optical glass has a refractive index from 1.54 to 1.62, and an Abbe number from 65 to 70.

7. The optical glass of claim 1, wherein the optical glass comprises $Li_2O$, $Na_2O$, $K_2O$, MgO and CaO.

* * * * *